United States Patent
Ryder et al.

(10) Patent No.: US 7,686,096 B2
(45) Date of Patent: Mar. 30, 2010

(54) BRAKE SYSTEM FOR A TOWED AGRICULTURAL IMPLEMENT

(75) Inventors: Nicholas G. Ryder, Saskatoon (CA); Trevor L. Kowalchuk, Saskatoon (CA); Calvin K. Greenstein, Saskatoon (CA); Trent W. Reimer, Saskatoon (CA)

(73) Assignee: CNH Canada, Ltd., Saskatoon, SK (CA)

( * ) Notice: Subject to any disclaimer, the term of this patent is extended or adjusted under 35 U.S.C. 154(b) by 1020 days.

(21) Appl. No.: 11/334,835

(22) Filed: Jan. 19, 2006

(65) Prior Publication Data

US 2007/0163790 A1   Jul. 19, 2007

(51) Int. Cl.
*A01B 49/00* (2006.01)
(52) U.S. Cl. ...................... 172/311; 172/588
(58) Field of Classification Search ................ 172/272, 172/310, 311, 588
See application file for complete search history.

(56) References Cited

U.S. PATENT DOCUMENTS

| | | | |
|---|---|---|---|
| 997,959 A | 7/1911 | Brigel | |
| 2,113,832 A * | 4/1938 | Everett | 172/581 |
| 2,138,948 A * | 12/1938 | Warne | 172/568 |
| 2,255,061 A * | 9/1941 | Johnson | 172/799.5 |
| 2,620,200 A * | 12/1952 | Anderson | 172/311 |
| 2,639,785 A | 5/1953 | Vickers | |
| 2,919,926 A | 1/1960 | Schwarz | |
| 3,043,402 A | 7/1962 | Stephenson | |
| 3,299,988 A | 1/1967 | Cook | |
| 3,426,870 A | 2/1969 | Noland | |
| 4,216,996 A | 8/1980 | Pitts | |
| 4,896,730 A * | 1/1990 | Jarrett et al. | 172/40 |
| 5,609,346 A | 3/1997 | Bellehumeur | |
| 5,713,436 A | 2/1998 | Gjovik | |
| 5,833,012 A * | 11/1998 | Pierce et al. | 172/199 |
| 6,663,164 B1 | 12/2003 | Guillez et al. | |
| 6,892,863 B2 | 5/2005 | Everett | |
| 7,226,393 B2 * | 6/2007 | Baker | 482/57 |
| D552,630 S * | 10/2007 | Garrison et al. | D15/27 |
| 7,367,407 B2 * | 5/2008 | Lannert | 172/684.5 |

FOREIGN PATENT DOCUMENTS

DE   3911468   10/1990

\* cited by examiner

*Primary Examiner*—Thomas B Will
*Assistant Examiner*—Joel F Mitchell
(74) *Attorney, Agent, or Firm*—Rebecca Henkel (57) ABSTRACT

A surface brake system for a detachable agricultural implement towed by a tow vehicle is provided. The detachable agricultural implement includes a frame connected by a telescoping tongue assembly at the tow vehicle. The frame and tongue assembly are movably supported by at least one wheel assembly having a circumferential tread surface. The brake system includes a pivot linkage pivotally connected at the frame of the detachable agricultural implement, and a horizontal aligned brake arm attached at the pivot linkage. The brake system further includes an actuator cylinder interconnected between the pivot linkage and the frame. Movement of the actuator cylinder causes the brake arm to engage a brake pad assembly against the outer circumferential tread surface of the wheel assembly so as to restrain movement of the wheel assembly and frame of the agricultural implement as the tow vehicle extends and retracts the telescoping tongue assembly.

11 Claims, 4 Drawing Sheets

BRAKE SYSTEM FOR A TOWED AGRICULTURAL IMPLEMENT

FIELD OF THE INVENTION

The invention relates to a brake system for an agricultural implement towed behind a tow vehicle, and more specifically, relates to a brake system configured to engage against a tread surface of a wheel assembly so as to restrain movement of the agricultural implement as the tow vehicle moves a telescoping tongue assembly between extended and retracted positions.

BACKGROUND OF THE INVENTION

Various types of agricultural implements have been developed that can be linked via an implement tongue assembly to a drawbar of a tractor or other type of tow vehicle to facilitate different tasks, including, for example, seeding, fertilizing and tilling. Hereinafter, unless indicated otherwise, the background of the invention and the present invention will be described in the context of an exemplary planting implement.

An important fact in accessing the value of a planting implement is how quickly the implement can accomplish the task of the implement. The speed in accomplishing the implement's task can be increased by reducing the number of passes required to perform the implement's task for a field. Certain known planting implements are configured to expand to operating field widths of 40-feet or more. Unfortunately, such expansive widths cannot be tolerated during planter transportation, storage, and egress of the implements to and from many agricultural fields. In particular, many farmers use commercial roadways to transport their planting implements to and from the fields, and essentially all roadways are not designed to accommodate expansive planting implements. The industry has developed planting implements that are operable to fold to and from a retracted configuration between transport and intended use.

One certain folding-type planting implement includes a single implement tool bar centrally mounted for pivotal movement on a wheel supported carrier platform where the single arm is pivotable about the mount so that approximately half of the bar extends over the tongue assembly and is a supportable thereby and the other half of the bar extends away from the tractor behind the chassis. The tongue assembly has to be long enough to accommodate the implement bar length plus some clearance so as to allow a tractor linked to the tongue assembly to turn left and right. For example, where the planting implement operating width is 40-feet, the tongue assembly generally has to be greater than 20-feet long.

To ensure planting along the entire edge of a field, a farmer typically starts seeding the field by first traveling around the edge of the field with a seeding implement at lease once and often two or more times along adjacent consecutively smaller paths prior to traveling in parallel rows through field. These field edge paths are generally referred to in the industry as headland passes. Performing one or more headland passes about a field edge prior to performing parallel passes provides a space for turning the tractor an implement around between parallel passes while still covering the entire space along the field edge. However, headland passes increase opportunities for driving over field sections that have already been seeded, crushing passed-over seeds or growing plants and reducing overall field production. As known in the industry, farms routinely attempt to reduce the number of headland passes required in a field.

The number of headland passes required to facilitate field coverage is related to the turning radius of a tractor and planter implement combination, and the turning radius of the combination is directly related to the length of the tongue assembly coupling the planting implement with the tractor. Recognizing that a short tongue assembly during planting operation reduces the number of headland passes and increases efficiency of the planting implement, and that a long tongue assembly is desirable to accommodate pivotal and scissors-type implement folding configurations, the industry has developed telescoping tongue assemblies driven by large hydraulic cylinders to extend and accommodate implement transport, and to retract and provide a minimal turning radius during operation.

However, the above-described agricultural implement has drawbacks. Methods that include extending and retracting the large hydraulic cylinders needed to manipulate a telescoping tongue assembly are costly to manufacture and operate. Also, extending and retracting large hydraulic cylinders requires a significant amount of hydraulic oil, which makes the process of extending and retracting the tongue assembly more time consuming. Therefore, there is a need or desire for an enhanced brake system for an agricultural implement that is less costly to manufacture, operate, and that reduces transition time in accommodating the implement between transport and operation in the field. The brake system should also be configured to be utilized with a wide variety of implements or trailers towed behind a tow vehicle, in addition to those related to agriculture.

SUMMARY OF THE INVENTION

The present invention provides a brake system for and a method of braking an agricultural implement being towed by a tow vehicle that meets the desires or needs described above.

In a first embodiment of the present invention, a brake system for a detachable agricultural implement towed by a tow vehicle is provided. The detachable agricultural implement is defined by a central longitudinal axis and includes a frame movably supported on a wheel assembly and a first tongue member fixedly attached to the frame and configured in telescoping relation to a second tongue member. The second tongue member pivotally interconnects the frame at a drawbar of the tow vehicle. The wheel assembly includes an outer circumferential tread surface. The brake system includes a pivot linkage pivotally connected at the frame of the detachable agricultural implement, a brake arm attached at the pivot linkage, and an actuator cylinder interconnected between the pivot linkage and the frame. Movement of the actuator cylinder causes the brake arm to engage against the outer circumferential tread surface of the wheel assembly so as to restrain movement of the wheel assembly and frame of the agricultural implement as the tow vehicle moves the second tongue member in telescoping relation to the first tongue member.

In the preferred brake system, the preferred pivot linkage includes a first plate member spaced from a second plate member. The first and second plate members are both vertically aligned and generally parallel to each other. The pivot linkage further includes a generally horizontal aligned intermediate bar fixedly interconnected between the first and second plate members. The actuator cylinder is pivotally connected at the horizontal aligned intermediate bar. The preferred brake arm is generally horizontal-aligned and interconnects the pivot linkage and a brake pad assembly. The brake arm includes an elongated bar having a first end opposite a second end and is generally aligned perpendicular to the central longitudinal axis of the agricultural implement. The pivot linkage is attached at a generally central location between the first and second ends of the brake arm. At least one of the first and second ends of the brake arm is attached by the brake pad assembly so as to engage the tread surface of the wheel assembly.

The brake system of the invention further includes an adjustable brake spacer assembly interconnecting the brake pad and the brake arm. The adjustable brake spacer is configured to selectively accommodate the brake system to engage against varying diameter of wheel assemblies of the towed agricultural implement. The preferred adjustable brake spacer assembly comprises a brake tube member having a hollow interior configured to receive the brake arm therein. The preferred brake arm is generally square-shaped, and the brake tube member includes a generally rectangular-shaped hollow interior in general conformance in shape and size to receive the brake arm therein. The adjustable brake spacer assembly further includes a spacer member located between an exterior surface of the brake arm and the interior of the brake tube member. The ability to vary the thickness or size of the spacer member allows the brake system to accommodate various sizes of wheel assemblies on the implement. The preferred brake system further includes a controller located at the tow vehicle and operable to selectively send a signal that causes movement of the actuator cylinder.

In another embodiment, the present invention provides an agricultural implement towed in a forward direction of travel by a draw bar of a tow vehicle. The implement includes a frame pivotally connected by a telescoping tongue assembly to the tow vehicle. The telescoping tongue assembly includes a first tongue member fixedly attached relative to the frame and configured to move in telescoping relation to a second tongue member. A wheel assembly is in movable support of the frame. The wheel assembly includes at least one wheel with a circumferential tread surface configured to engage a ground surface. The agricultural implement further includes a brake system mounted at the frame of the agricultural implement. The brake system selectively restrains movement of the wheel assembly and the frame of the agricultural implement as the tow vehicle moves the second tongue member in telescoping relation to the first tongue member.

The present invention also provides a method of braking an agricultural implement towed behind a draw bar of a tow vehicle. The implement includes a frame pivotally attached by a telescoping tongue assembly at the tow vehicle. The telescoping tongue assembly includes a first tongue member configured to move in telescoping relation to a second tongue member, and the second tongue member pivotally attached at the tow vehicle. The method includes the steps of generating a signal at a controller located at the tow vehicle; pivoting a pivot linkage at the implement in response to the signal; engaging a brake pad assembly mounted at the pivot linkage against a circumferential tread surface of a wheel in movable support of the implement; restraining movement of the wheel and the frame of the implement with the step of engaging the brake pad assembly; and moving the tow vehicle during the restraining step so as to move the second tongue member in telescoping relation to the first tongue member.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
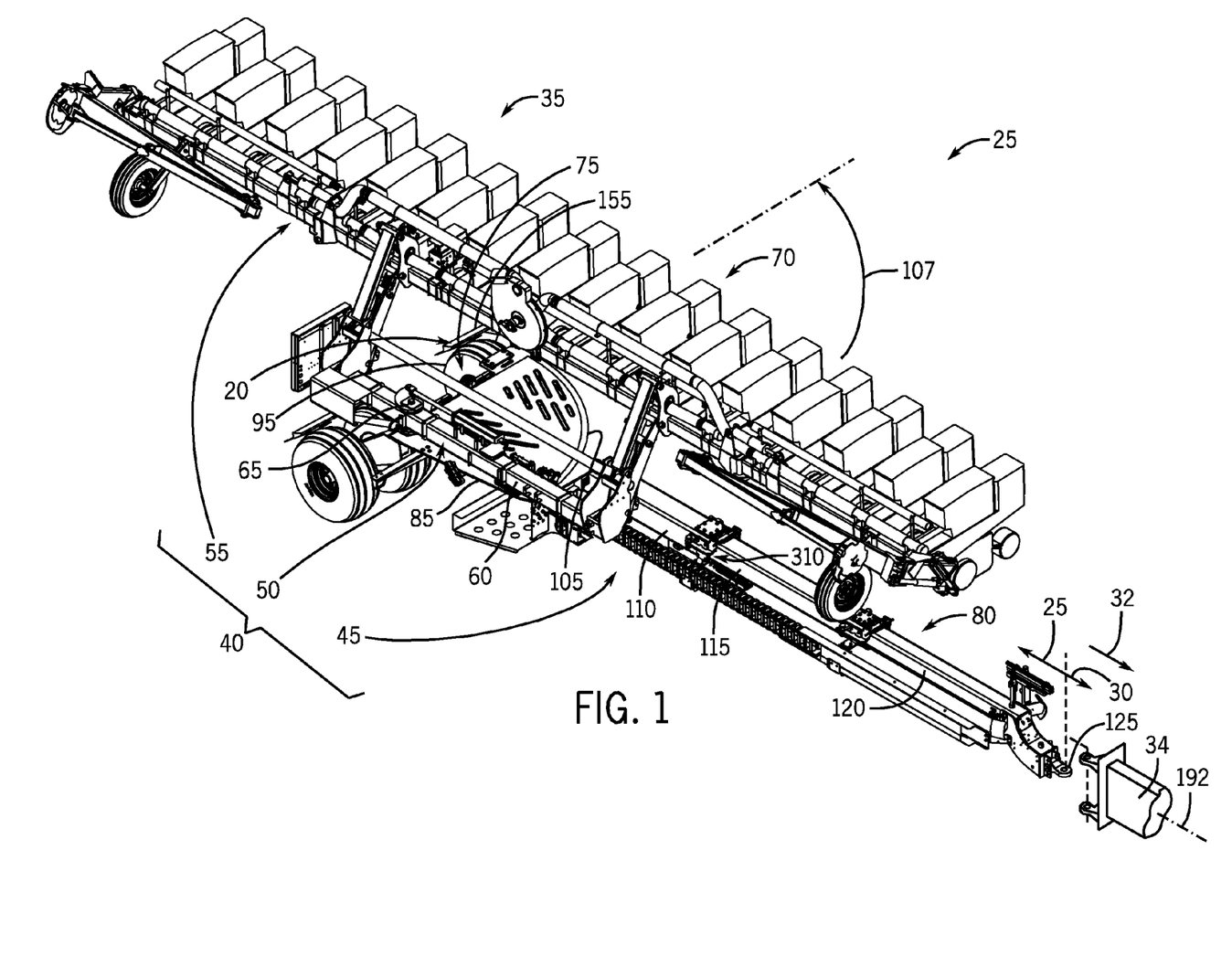
FIG. 1 illustrates a perspective view of an agricultural planting implement employing a brake system in accordance with the present invention.
Figure 2:
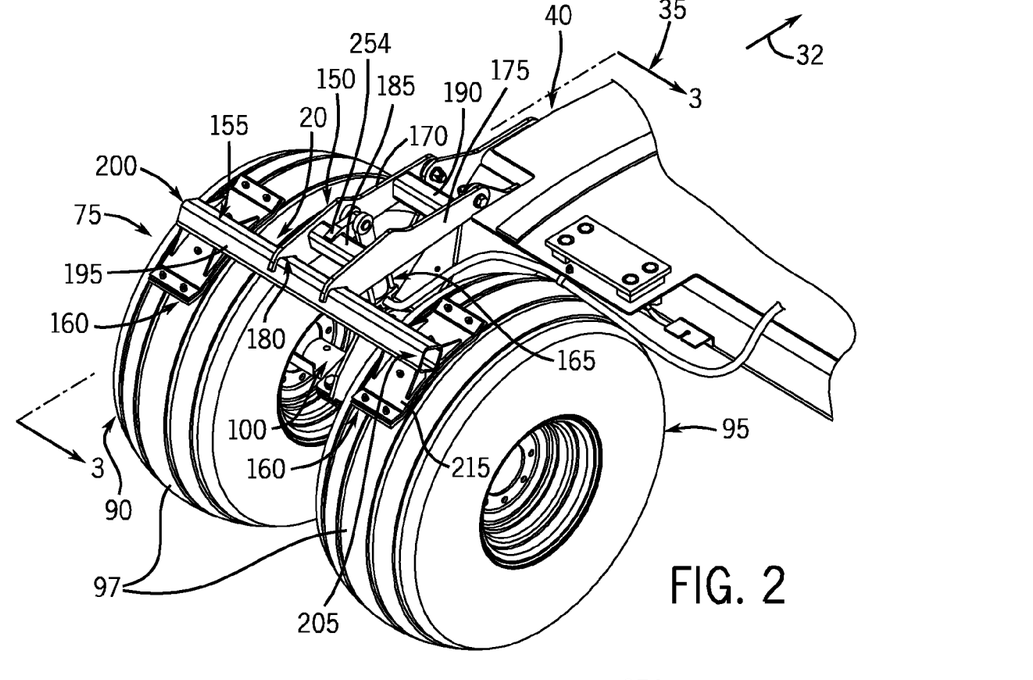
FIG. 2 is detailed perspective view of a wheel assembly of the agricultural planting implement of FIG. 1 in combination with the brake system in accordance with the present invention.

Referring to FIGS. 1 and 2, a brake system 20 is provided for braking an implement (illustrated by arrow and reference 25) configured to be connected and towed behind a tow vehicle (illustrated by arrow and reference 30) in a forward direction of travel 32. The tow vehicle 30 generally includes a draw bar 34 configured to be connected at the towed implement 25 in a known manner.

A preferred towed implement is an agricultural drill or planting implement 35 operable to distribute a supply of product (e.g., seed, fertilizer, pesticide, herbicide, etc.) in a field. The exemplary planting implement 35 is described in U.S. Pat. No. 6,663,134 entitled "Planter Hitch Apparatus," filed Jan. 31, 2002 , the entirety of which is hereby incorporated herein by reference. Yet, the brake system 20 can be configured with other types of towed implements (e.g., an air cart, a trailer, etc.) and is not limiting on the invention.

FIG. 1 illustrates the brake system 20 mounted on a frame assembly 40 of the planting implement 35. The frame assembly 40 of the preferred planting implement 35 generally includes a carrier assembly 45, a main frame assembly 50, and an implement assembly 55. As its label implies, the carrier assembly 45 generally includes components configured to facilitate transport or carrying of the main frame assembly 50 and the implement assembly 55. Similarly, as their labels imply, the main frame assembly 50 generally includes a main frame bar 60 and components configured to support the implement assembly 55 about a pivot 65 on the carrier assembly 45 for movement between an operating position and an inoperative position for transport (as shown in FIG. 1) in a generally known manner. The illustrated embodiment of the implement assembly 55 generally includes components configured in a known manner to carry out a specific agricultural processes corresponding to a specific agricultural implement. The components of the exemplary implement assembly 55 are planting row unit devices 70 used in a known manner for fertilizing and/or planting seed product in a field.

Still referring to FIG. 1, the carrier assembly 45 generally includes wheel assemblies 75, a telescoping tongue assembly 80 and a platform 85. Referring now to FIG. 2, each wheel assembly 75 includes a first tire or wheel 90 and a second tire or wheel 95 both having a tread surface 97 and supported on a common axle 100.

As shown in FIG. 1, the platform 85 is essentially a horizontal aligned, rigid, planar-shaped bed member that includes a track runner 105 that defines an arc-shape for pivotal support of the main frame bar 60 relative to the pivot 65 of the carrier assembly 45. The main frame bar 60 and implement assembly 55 attached thereto are pivotally mounted by the pivot 65 so as to be moveable between a transport position illustrated in FIG. 1 and an operative position rotated ninety degrees relative thereto (as illustrated by arrow 107), and to any intermediate position therebetween by simply rotating the main frame bar 60 about the pivot 65. Any means for driving rotation of the main frame bar 60 about the pivot 65 may be employed. The main frame assembly 50 in the operative position is consistent with reducing the number of required headland passes needed to perform an agricultural task for an entire field. However, in order to accommodate a long configuration of the main frame assembly 50 and implement assembly 55 supported thereon in the transport position shown in FIG. 1, the telescoping tongue assembly 80 is extended.

Still referring to FIG. 1, the exemplary telescoping tongue assembly 80 is a three-stage assembly that includes a first tongue member 110, a second tongue member 115, and a third tongue member 120 and a hitch 125. The first tongue member 110 is fixed relative to the platform 85, while the second and third tongue member 115 and 120, respectively, are movable in relation to the first tongue member 110. The hitch 125 is secured to the forward free end of third tongue assembly 120. The exemplary first, second, and third tongue members 110, 115 and 120, respectively, are tubular shaped and of dimension such that the third tongue member 120 received within the second tongue member 115 with minimal clearance, and the second tongue member 115 is dimensioned to be received with minimal clearance within the first tongue member 110. It should also be appreciated that additional stages may be added or removed to the tongue assembly 80 by providing additional arms or removing an arm. Thus, it should be understood that the brake system 20 of the invention can be implemented on an implement with a two-stage telescoping tongue assembly (not shown).

Figure 6:
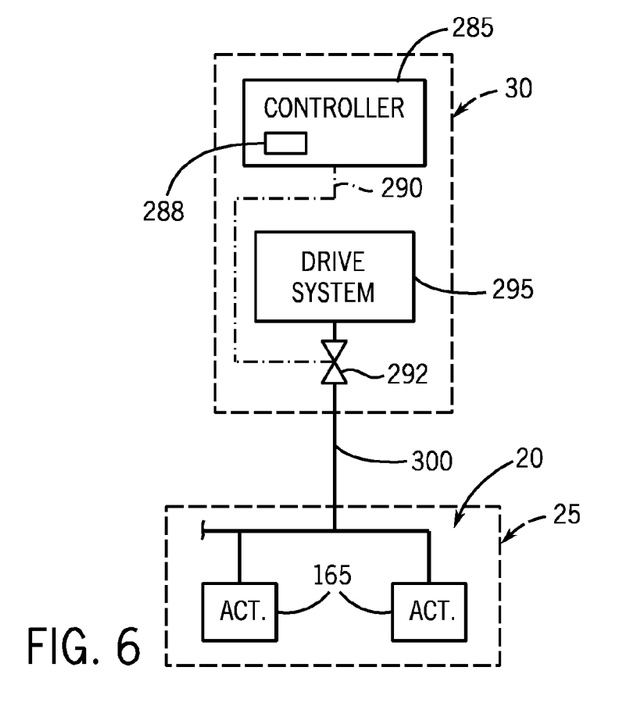
FIG. 6 is a schematic of a circuit diagram of a brake system in accordance with the present invention.

As shown in FIGS. 1 and 2, the brake system 20 in accordance with the present invention is mounted at the frame assembly 40 so as to selectively engage a respective wheel assembly 75 of the planting implement 35. Referring specifically to FIG. 2, one embodiment of the brake system 20 generally includes a pivot linkage 150, a brake arm 155 fixedly attached at the pivot linkage 150 relative thereto, at least one brake pad assembly 160, and an actuator cylinder 165. Actuation of the brake system 20 selectively restrains movement of the wheel assembly 75 and the supported frame assembly 40 of the planting implement 35 relative to the ground. With restraint of the wheel assembly 75 and frame assembly 40 of the planting implement 35, the tow vehicle 30 (See FIG. 6) moves the third tongue member 120 in telescoping relation to the first tongue member 110, and the further movement causes the second tongue member 115 to move in telescoping relation to the first tongue member 110 between a retracted position (not shown) and an extended position (See FIG. 1).

Figure 3:
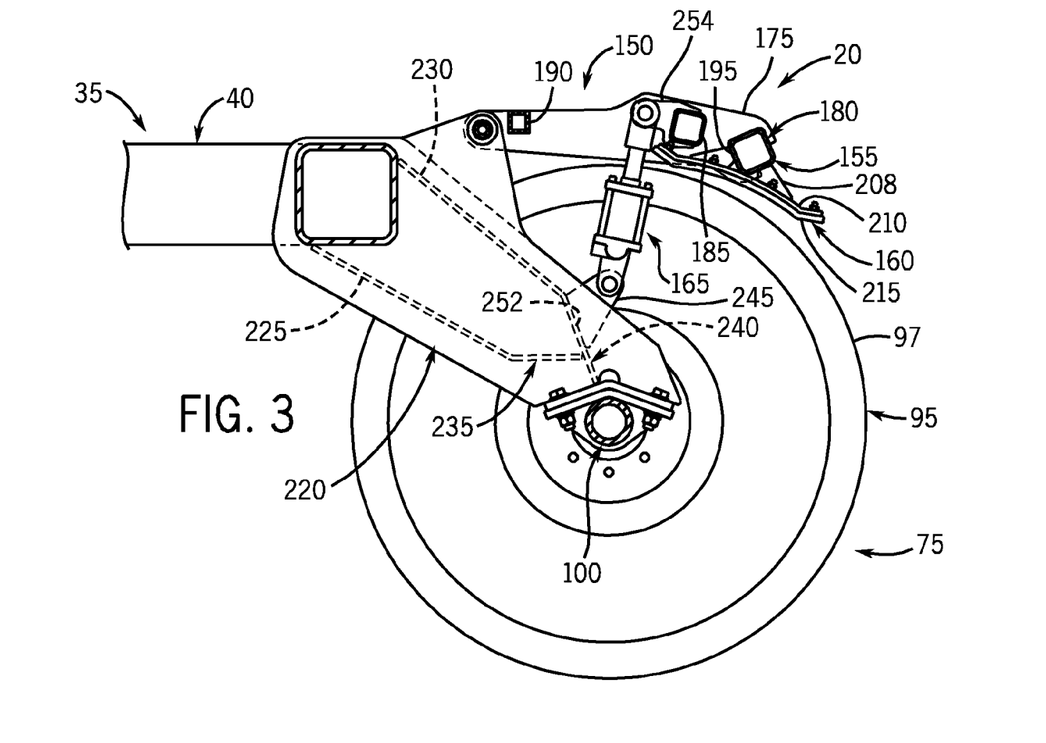
FIG. 3 is a cross-section view along line 3-3 shown in FIG. 2 of the wheel assembly of the agricultural planting implement in combination with the brake system.
Figure 4:
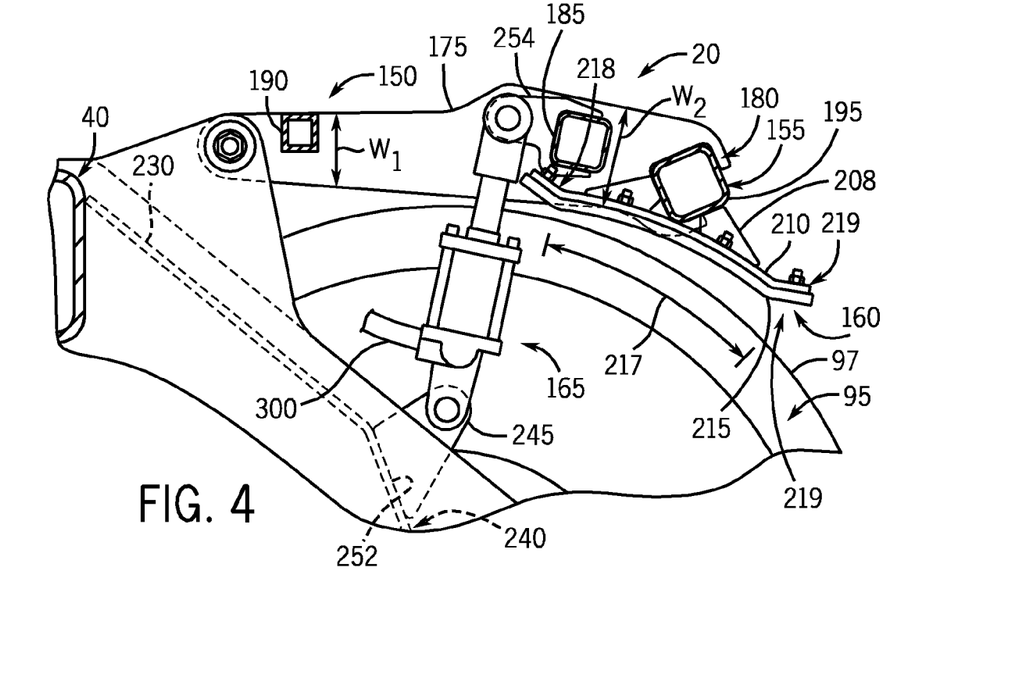
FIG. 4 is a detailed cross-sectional view of the brake system shown in FIG. 3, the brake system in a disengaged position relative to the wheel assembly.
Figure 5:
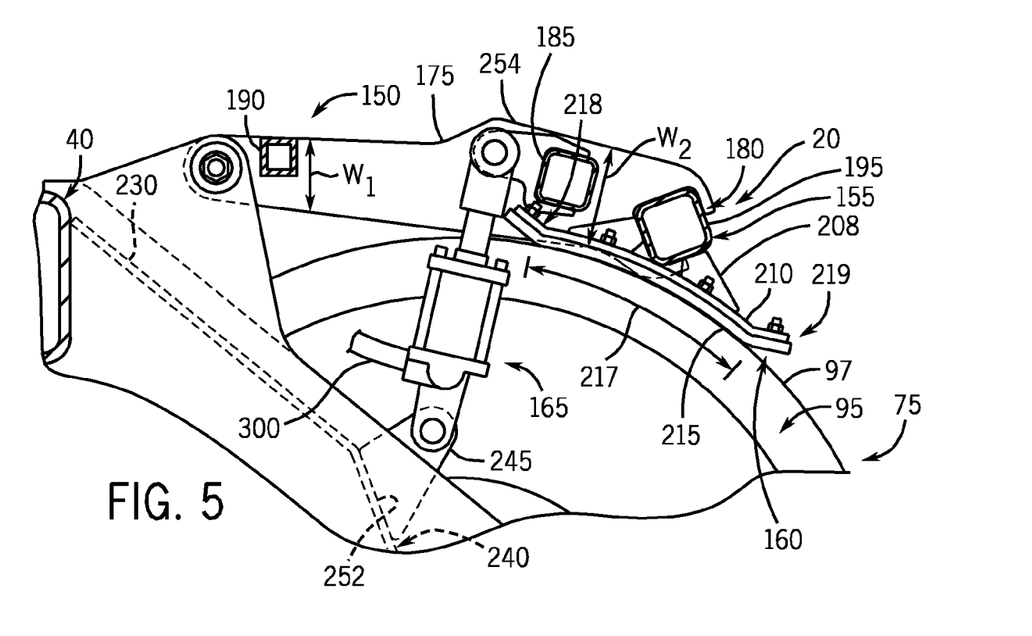
FIG. 5 is a detailed cross-sectional view of the of the brake system shown in FIG. 4, the brake system in an engaged position in relation to the wheel assembly.

As illustrated in FIGS. 2 and 3, the pivot linkage 150 is pivotally connected at the frame assembly 40 of the detachable planting implement 35 between the first and second wheels 90 and 95 of the wheel assembly 75. One embodiment of the pivot linkage 150 comprises a first plate member 170 spaced laterally from a second plate member 175 relative to the forward direction 32. Both first and second plate members 170 and 175 are generally vertically aligned and generally parallel to each other. One end of both the first and second plate members 170 and 175 is pivotally attached at the frame assembly 40 of the implement 35. An opposite end of both the first and second plate members 170 and 175 includes a slot 180 to receive the brake arm 155 therein. As shown in FIGS. 4 and 5, a vertical width ($w_1$) at a first end of both first and second plate members 170 (See FIG. 2) and 175 pivotally attached at the frame 40 is smaller relative to a vertical width ($w_2$) at the other end of both first and second plate members 170 (See FIG. 2) and 175 on the opposite side of an intermediate member 185 (described later) relative to the first end. The greater width ($w_2$) at the end of both first and second plate members 170 and 175 is configured to accommodate miscellaneous forces transmitted from the actuator cylinder 165 to the brake arm 155 and against the wheel assembly 75. Referring again to FIGS. 2 and 3, the pivot linkage 150 further includes the first intermediate bar 185 and a second intermediate bar 190 both generally horizontally aligned. Both first and second intermediate bars 185 and 190 are fixedly interconnected (e.g., welded) between both first and second plate members 170 and 175. The second intermediate bar 190 is located forward relative to the location of the first intermediate bar 185.

Referring back to FIG. 1, the brake arm 155 is generally aligned perpendicular to a central longitudinal axis 192 of the planting implement 35. As shown in FIG. 2, the illustrated embodiment of the brake arm 155 includes a generally horizontal aligned, elongated bar 195 comprised of structural tubing. The elongated bar 195 is generally square-shaped in cross-sectional dimension and includes a first end 200 opposite a second end 205. The first and second plate members 170 and 175 of the pivot linkage 150 are fixedly attached at the brake arm 155 at a generally central location between the first and second ends 200 and 205, respectively.

Still referring to FIG. 2, the brake pad assembly 160 is rigidly attached by a gusset plate member 208 at each of the first and second ends 200 and 205 of the brake arm 155 and provides a friction contact with a tread surface 97 of each wheel 90 and 95. As shown in cross-section view in FIGS. 3-5, one embodiment of the brake pad assembly 160 generally includes a brake plate member 210 in uniform support of a brake pad member 215. The brake pad member 215 is generally comprised of a composition known to those skilled in the art to achieve a desired friction with the tread surface 97 of the wheel 95. The shape of the surface or profile of the brake plate member 210 and/or brake pad member 215 can vary to conform to the shape of the tread surface 97 and size of the wheel 95. As shown in FIGS. 4 and 5, a central surface area or profile 217 of the brake plate member 210 and brake pad member 215 is generally curvilinear so as to conform and make desired contact with the tread surface 97 of the wheel 95. Opposite forward and rearward ends 218 and 219, respectively, of the brake plate member 210 and brake pad member 215 are generally angled away in relation to the tread surface 97 of the wheel 95 so as to control friction forces transmitted to the wheel 95. The size of the angled ends 218, 219 of the brake plate member 210 and brake pad member 215 can vary so as to achieve the desired surface contact with the wheel 95. The different material compositions and profiles of the brake plate member 210 and brake pad member 215 change the brake characteristics and braking force transmitted by the brake arm 155 to the wheel 95.

Referring back to FIG. 3, the actuator cylinder 165 is interconnected between the pivot linkage 150 and the frame assembly 40. Specifically, a lower end of the actuator cylinder 165 is pivotally connected to the frame assembly 40 by an actuator support structure 220 comprising a lower support arm 225 and an upper support arm 230. The upper support arm 230 is a generally angled support plate member fixedly connected between the frame assembly 40 and the axle 100 of the wheel assembly 75. The lower support arm 225 is a similar angled support plate member aligned in an opposite orientation in relation to the angle of the lower support arm 230. An upper end of the lower support arm 225 is fixedly attached at the frame assembly 40. A lower angled end 235 of the lower support arm 225 is fixedly attached at a lower angled end 240 of the lower support arm 225. The lower end of the actuator cylinder 165 is pivotally connected at a mount 245 extending upward from an upper surface 252 of the upper support arm 230. An upper end of the actuator cylinder 165 is pivotally connected by an actuator linkage 254 to the intermediate bar 185 of the pivot linkage 150. One end of the actuator linkage 254 is pivotally attached at the actuator cylinder 165, and the opposite second end of the actuator linkage 254 is fixedly attached at the intermediate bar 185 of the pivot linkage 150.

FIG. 4 illustrates how extension of the actuator cylinder 165 moves the brake arm 155 and attached brake pad assembly 160 out of engagement with the outer circumferential tread surface 97 of the wheel 95. FIG. 5 illustrates how retraction of the actuator cylinder 165 moves the brake arm 155 and attached brake pad member 215 into engagement with the outer circumferential tread surface 97 of the wheel 95. Adjustment of a stroke length of the actuator cylinder 165, the pressure in the cylinder 165, and the size of the cylinder 165 allows adjustment of the braking force applied by the brake arm 155 via the brake pad assembly 266 to the wheel assembly 75. The preferred actuator cylinder 165 is hydraulic driven. Yet, the type (e.g., pneumatic, hydraulic, electric, etc.) of actuator cylinder 165 can vary. Although operation of the brake system 20 is described for the brake pad assembly 160 at the second end 205 of the brake arm 155 relative to the wheel 95, it should be understood that the brake pad assembly 160 at the first end 200 of the brake arm 155 is constructed to operate in a similar manner.

Figure 7:
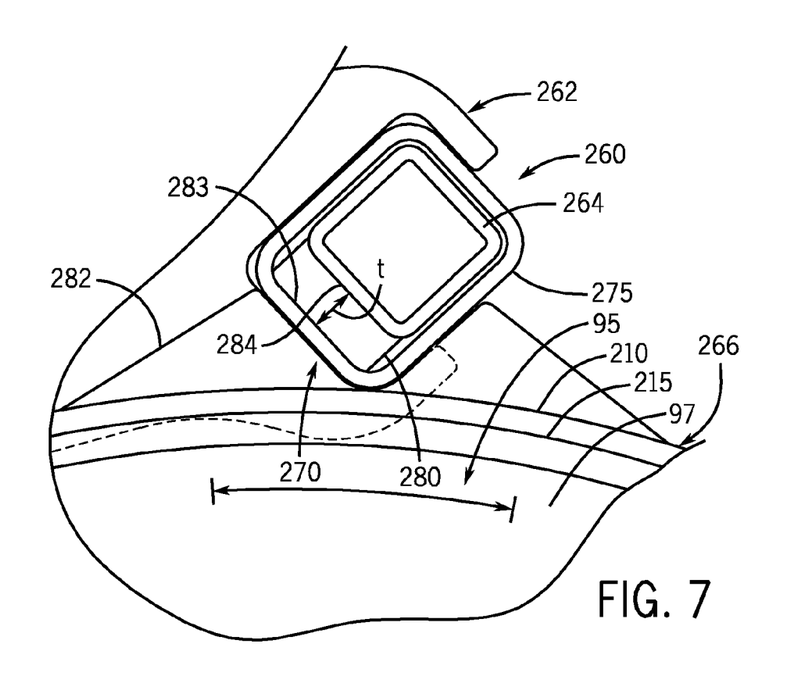
FIG. 7 is a side elevation view of the brake system of the present invention employing a brake spacer assembly.

As illustrated in FIG. 7, in alternative to adjustment of the stroke length of the actuator cylinder 165, the brake system 260 includes a pivot linkage 262, a brake arm 264, and a brake pad assembly 266 similar in construction to the brake system 20 described above so as to be moved by an actuator cylinder (not shown) into selective engagement with a tread surface 97 of a wheel 95. The brake system 260 further includes an adjustable brake spacer assembly 270 configured to selectively accommodate the brake system 260 to various sizes of wheels 90 and 95 on the wheel assembly 75. The brake spacer assembly 270 selectively adjusts a distance between the brake arm 264 and the brake pad assembly 266 in a manner so that the brake system 20 can accommodate varying diameters of wheels 90 and 95. The brake spacer assembly 270 generally includes a brake tube member 275 that defines a hollow interior space, and a spacer member 280 mounted therein. The hollow interior space of the brake tube member 275 is generally rectangular-shaped in general conformance to receive the square-shaped brake arm 264 therein. The brake pad assembly 266 is not fixedly attached at the brake arm 264 as described above for the brake arm 155 of brake system 20. Rather, a brake plate member 210 and brake pad member 215 of the brake pad assembly 266 are rigidly attached by a gusset plate member 282 at the brake tube member 275. The spacer member 280 is located between an interior surface 283 of the brake tube member 275 and an exterior surface 284 of the brake arm 264. By varying the thickness (t) of the spacer member 280, an operator manually adjusts a reach of the brake arm 264 and the brake pad assembly 266 so as to properly engage the tread surface 97 of the wheels 90 and 95 mounted on the wheel assembly 75.

Referring back to FIG. 6, the brake system 20 further includes a controller 285 located at the tow vehicle 30 and operable to selectively send a signal that causes extension of the actuator cylinder 165 at each wheel assembly 75 (See FIG. 1). The controller 285 includes an input device such as a selector switch 288. In response to an operator input or actuation of the selector switch 288, a signal is transmitted via a communication link 290 (e.g., wireless or hardwired) to a control valve 292 at an actuator drive source 295 so as to cause actuation (e.g., retraction or extension) of the actuator cylinder 165 in a manner that moves the brake pad 160 into engagement with or disengagement away from the wheel assembly 75 (See FIGS. 2-5). The type of signal (e.g., wireless, electrical voltage, electrical current, etc.) can vary. Also, the location of the control valve 292 at one of the tow vehicle 30 and the implement 35 can vary.

Although the above description refers to the brake system 20 at the wheel assembly 75, it should be understood to one skilled in the art that the brake system 20 of the present invention can be mounted to multiple wheel assemblies in support of the planting implement 35 and is not limiting on the invention.

Having described the general structure of the brake system 20 of the present invention, the following is a general description of the operation of the brake system 20 in braking the agricultural planting implement 35 so as to allow the forward moving tow vehicle 30 to extend and retract the second or third tongue members 115 and 120, respectively, in telescoping relation to the first tongue member 110.

Assume, for example, that tongue assembly 80 is initially locked in a completely retracted position and the brake system 20 is not engaged with the wheel assembly 75 of the implement 35, as shown in FIG. 4. In order to extend the tongue assembly 80, the operator actuates the selector switch 288 at the controller 285 so as to generate a signal indicative of an operator command to apply a brake force at the wheel assembly 75 of the implement 35. In response to the signal, the drive source 295 in combination with the control valve 292 provides a flow of fluid (e.g., air or hydraulic fluid) via a fluid line 300 in a known manner to cause retraction of the actuator cylinder 165 of the brake system 20 of the invention. As shown in FIG. 5, the pumped fluid causes the actuator cylinder 165 to retract and drive downward pivotal movement of the pivot linkage 150 and attached brake pad assembly 160 in a downward direction against the tread surface 97 of one of the wheels 90 and 95 of the wheel assembly 75. Once the brake arm 155 and attached brake pad assembly 160 are engaged to restrain movement of the wheel assembly 75 and frame assembly 40 supported thereon, the tow vehicle 30 moves in a forward direction 32 to extend the second or third tongue member 115 and 120 in telescoping relation to the first tongue member 110. A hydraulically activated lock 310 (See FIG. 1) selectively secures the extended position of the tongue member 115 and 120 relative to the first tongue member 110. The extended tongue assembly 80 provides for accommodating rotation of the main frame assembly 50 and attached implement assembly 55 in relation to the carrier assembly 45 to an inoperative position (See FIG. 1). Once in the transport position, the operator actuates the controller 285 so as to cause the brake system 20 to disengage and release the wheels 90 and 95 of the wheel assembly 75 and allow the tow vehicle 30 to freely move the implement 35.

In an opposite manner, the tongue assembly 80 is retracted to an operative position to enhance maneuverability of the implement 35 for work in the field. The main frame assembly 50 and attached implement assembly 55 are rotated about the pivot 65 generally ninety-degrees from a transport position to an extended position (illustrated by arrow 107) in relation to the carrier assembly 45. The operator actuates the controller 285 so as to send a signal via the communication link 290 indicative of an operator command to cause the brake system 20 to restrain movement of the wheel assembly 75 and the frame assembly 40 supported thereon. In response to the signal, the control valve 292 in combination with the actuator drive source 295 creates the fluid flow via the fluid line 300 so as to cause the actuator cylinder 165 to move the brake pad 160 against the tread surface 97 of the wheel assembly 75, as described above. With the wheel assembly 75 of frame 40 of the implement 35 restrained by the brake system 20, the tow vehicle 30 moves in a rearward direction, opposite in relation to direction 32, to retract the second or third tongue member 115 and 120 in telescoping relation to the first tongue member 110. The operator, via actuation of the controller 285, then causes the brake system 20 to release and disengage away from the wheel assembly 75 (See FIG. 4) so that the wheel assembly 75 is free to moveably support the implement 35.

It should be understood that a wide variety of implements could employ the brake system 20 constructed in accordance with the present invention. Thus, while the invention is disclosed with reference to a planting implement 35 towed behind the tow vehicle 30, the invention is not so limited. One skilled in the art will recognize that the brake system 20 of the present invention can be employed to brake or restrain movement of various types of towed implements (e.g., air carts, trailers, etc.) connected to a tow vehicle 30 and is not limiting on the invention.

Many changes and modifications could be made to the invention without departing from the spirit thereof. The scope of these changes will become apparent from the appended claims.

We claim:

1. A brake system for a detachable agricultural implement towed by a tow vehicle, the detachable agricultural implement having a frame movably supported by a wheel assembly having an axle and a first tongue member configured in telescoping relation to a second tongue, the second tongue member configured to pivotally interconnect the frame at a drawbar of the tow vehicle, the detachable agricultural implement defined by a central longitudinal axis relative to a forward direction of travel, said frame connected to an implement assembly having a plurality of planting row devices, the wheel assembly having an outer tread surface, the brake system comprising:

a pivot linkage pivotally connected at the frame of the detachable agricultural implement; said pivot linkage comprises a first plate member spaced from a second plate member, the first and second plates both vertically aligned and generally parallel to each other and having opposing first and second ends; said second ends of first and second plate members includes a slot; the pivot linkage includes generally horizontal aligned first and second intermediate bars fixedly interconnected between the first and second plates, wherein said second intermediate bar is located forward of said first intermediate bar; and a brake arm attached at the pivot linkage; said brake arm includes an elongated bar having a first end opposite a second end, wherein the pivot linkage is attached at a generally central location between the first and second ends, and further comprising a brake pad assembly located at the first and second ends of the brake arm, wherein the brake pad assembly is configured to engage against the outer circumferential tread surface of the wheel assembly; the brake arm is generally aligned perpendicular to the central longitudinal axis of the agricultural implement; wherein said slot of said first and second plate members receives said brake arm; and an actuator cylinder having an upper end and a lower end interconnected between the pivot linkage and the frame, wherein said upper end of the actuator cylinder is pivotally connected at the horizontal aligned first intermediate bar; wherein said lower end of the actuator cylinder connected to said frame by an actuator support structure comprising a lower support arm and an upper support arm; said upper support arm is angled connected between the frame and the axle of said wheel assembly;

wherein movement of the actuator cylinder causes the brake arm to engage against the outer circumferential tread surface of the wheel assembly and restrain movement of the wheel assembly and frame of the agricultural implement as the tow vehicle moves the second tongue member in telescoping relation to the first tongue member; wherein said brake system restrains said wheel assembly and the frame assembly of said detachable agricultural implement, said tow vehicle moves in a telescoping relation to said first tongue member to further move said second tongue member between a retracted position and an extended position.

2. The brake system of claim 1, further comprising an adjustable brake spacer assembly interconnecting the brake pad assembly and the brake arm, wherein the adjustable brake spacer is configured to selectively adjust a location of the brake pad assembly so as to engage varying diameters of wheels on the implement.

3. The brake system of claim 2, wherein the adjustable brake spacer assembly comprises a brake tube member having a hollow interior configured to receive the brake arm therein.

4. The brake system of claim 3, wherein the brake arm is generally square-shaped, and wherein the brake tube member is generally rectangular-shaped in general conformance to receive the brake arm therein.

5. The brake system of claim 3, wherein the adjustable brake spacer assembly further includes a spacer member located between an exterior surface of the brake arm and the interior of the brake tube member.

6. The brake system of claim 1, further comprising a controller located at the tow vehicle and operable to selectively send a signal that causes movement of the actuator cylinder.

7. An agricultural implement towed in a forward direction of travel by a tow vehicle, comprising:

a first tongue member configured in telescoping relation to a second tongue member, the first tongue member fixedly attached relative to a frame the second tongue member configured to pivotally interconnect the frame at the tow vehicle;

an implement assembly connected by a pivot on said frame; said implement assembly having mounted transversely a plurality of planting row unit devices;

a wheel assembly having an axle in movable support of the frame, the wheel assembly having at least one wheel with a circumferential tread surface configured to engage the ground;

a brake system mounted at the frame of the agricultural implement, the brake system comprises:

a pivotal linkage pivotally mounted at the frame of the agricultural implement, the pivot linkage comprises a first plate member spaced from a second plate member, the first and second plates both vertically aligned and generally parallel to each other and having opposing first and second ends; said second ends of first and second plate members includes a slot, the pivot linkage includes a generally horizontal aligned first intermediate bar fixedly interconnected between the first and second plate members;

a brake arm fixedly attached at the pivot linkage, said slot of first and second plate members receives said brake arm; and a first and a second brake pad assembly fixedly attached at the brake arm, each brake pad assembly configured to engage one of the first and second wheels, wherein the brake arm includes an elongated bar having a first end opposite a second end, wherein the first and second brake pads are located at one of the first and second ends of the brake arm, and wherein the pivot linkage is attached at a generally central location between the first and second brake assemblies; the brake arm is generally aligned perpendicular to a central longitudinal axis of the agricultural implement; wherein the brake arm is generally aligned perpendicular to a central longitudinal axis of the agricultural implement.

wherein the brake system selectively restrains movement of the wheel assembly and the frame of the agricultural implement as the tow vehicle moves the second tongue member in telescoping relation to the first tongue member between a retracted and extended position; and an actuator cylinder having an upper end and a lower end configured to selectively engage the first and second brake pad assemblies against the first and second wheels, respectively, and wherein said upper end of the actuator cylinder is pivotally connected at the horizontal aligned first intermediate bar: wherein said lower end of the actuator cylinder connected to said frame by an actuator support structure comprising a lower support arm and an upper support arm: said upper support arm is angled connected between the frame and the axle of said wheel assembly.

8. The agricultural implement of claim 7, wherein the wheel assembly includes a first wheel and a second wheel supported on a common axle, and wherein the pivot linkage pivotally mounted on the frame between the first and second wheels.

9. The agricultural implement of claim 7, wherein the brake system further comprises:

an adjustable brake spacer assembly interconnecting each brake pad assembly at the brake arm.

10. The agricultural implement of claim 9, wherein the adjustable brake spacer assembly comprises a brake tube member having a hollow interior configured to receive the brake arm therein, and a spacer member detachably located between an exterior surface of the brake arm and an interior surface of the brake tube member.

11. The agricultural implement of claim 7, further comprising a controller located at the tow vehicle and operable to selectively send a signal that causes movement of the actuator cylinder.

\* \* \* \* \*